United States Patent
Veselova et al.

(10) Patent No.: US 7,650,641 B2
(45) Date of Patent: Jan. 19, 2010

(54) LIGHTWEIGHT PRIVACY COVER FOR DISPLAYED SENSITIVE INFORMATION

(75) Inventors: Olga Y. Veselova, Sammamish, WA (US); Owen C. Braun, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 11/173,627

(22) Filed: Jul. 1, 2005

(65) Prior Publication Data

US 2007/0006316 A1  Jan. 4, 2007

(51) Int. Cl.
  G06F 7/04    (2006.01)
  G06F 21/00  (2006.01)

(52) U.S. Cl. .............. 726/26; 726/2; 726/27; 705/50; 713/189

(58) Field of Classification Search .......... 380/54, 380/200–242, 287; 705/50–51, 57–59; 713/189; 715/741, 743; 726/2, 26–30
See application file for complete search history.

(56) References Cited

U.S. PATENT DOCUMENTS

| | | | | |
|---|---|---|---|---|
| 5,801,697 A | * | 9/1998 | Parikh et al. | 715/790 |
| 6,146,275 A | * | 11/2000 | Asai et al. | 463/31 |
| 6,367,012 B1 | * | 4/2002 | Atkinson et al. | 713/176 |
| 7,428,701 B1 | * | 9/2008 | Gavin et al. | 715/243 |
| 2003/0177498 A1 | * | 9/2003 | Ellis et al. | 725/60 |
| 2004/0193910 A1 | * | 9/2004 | Moles | 713/200 |

OTHER PUBLICATIONS

Houser, Software helps tidy up FOIA responses (six redaction software packages are reviewed—includes glossary of electronic redaction terms), Government Computer News, v16, n33, p29(3), Oct. 27, 1997.*
"Redaction template for Microsoft Word," www.va.gov/foia/redactor as archived by www.archive.org Jun. 26, 2004.*
"Redax User Guide, Version 3.5," Appligent Inc, 2003.*
Weverka et al, "Windows XP GIGABOOK for Dummies," Wiley Publishing Inc, 2004.*

* cited by examiner

*Primary Examiner*—Kimyen Vu
*Assistant Examiner*—Darren Schwartz
(74) *Attorney, Agent, or Firm*—Merchant & Gould P.C.

(57) ABSTRACT

Methods, systems and computer products are provided for preventing display of sensitive information. Displayed information may be designated as sensitive information and may be covered from display on a computer screen display by an opaque covering. The sensitive information covering may be removed to expose the underlying information in response to minimal user action. Uncovered sensitive information may be automatically re-covered according to a number of triggering mechanisms.

13 Claims, 5 Drawing Sheets

LIGHTWEIGHT PRIVACY COVER FOR DISPLAYED SENSITIVE INFORMATION

BACKGROUND

With the advent of the computer age, computer and software users have grown accustomed to user-friendly software applications that help them write, calculate, organize, prepare presentations, send and receive electronic mail, make music, and the like. For example, modern electronic word processing applications allow users to prepare a variety of useful documents. Modern electronic notes applications allow users to store, sort, review and utilize typed and handwritten notes.

Often users enter information into electronic documents created by such applications that is considered sensitive information that should not be displayed to other persons. For example, notes or other information may be entered into a notes application that include personal or business financial information, or a supervisor may enter typed or handwritten notes regarding the work performance of an employee. If a document or other data entry medium containing the sensitive information is displayed on a computer screen display, persons entering visual range of the computer screen display may be able to read or otherwise review the sensitive information as displayed.

Methods have been employed for password protecting portions of information from display to unauthorized users. For example, if a user attempts to open and display a password-protected portion of information, the user must enter a password into a password dialog for gaining access to the desired information. Such methods do prevent unauthorized access, but such methods require too much user interaction and time consumption for information that is sensitive but that does not require password protection. Often users would simply like to cover sensitive information with a lightweight cover to prevent display of the information in a manner that allows the sensitive information to be subsequently uncovered by an authorized user with minimal user action and time consumption.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the present invention solve the above and other problems by providing methods, systems and computer products for preventing display of sensitive information. According to embodiments of the invention, typed, handwritten or otherwise entered information may be designated as sensitive information and may be covered from display on a computer screen display. An entire folder of information, a section of a folder of information, a page of information, or paragraphs, sentences or words may be designated as sensitive information. Once a portion of information is designated as sensitive information, it is covered from view when the designated portion of information is displayed. For example, if a page of data is displayed on a computer screen display screen and the page of data contains a paragraph that has been designated as sensitive, the paragraph will be covered from view as if highlighted by color that prevents viewing of the underlying covered information.

According to embodiments of the invention, the sensitive information covering may be removed to expose the underlying information through minimal user action. For example, the covering may be removed by selecting the covering with a mouse click or other selection means such as a carriage return. Uncovered sensitive information may be automatically re-covered according to a number of triggering mechanisms. For example, uncovered sensitive information may be automatically re-covered after a prescribed period of time without user action or upon selection of a different portion of information not included in the designated sensitive information.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, methods, systems, and computer products are provided for applying a privacy cover over designated portions of information to prevent the designated portions of information from being displayed to unauthorized users. In the following detailed description, references are made to the accompanying drawings that form a part hereof and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
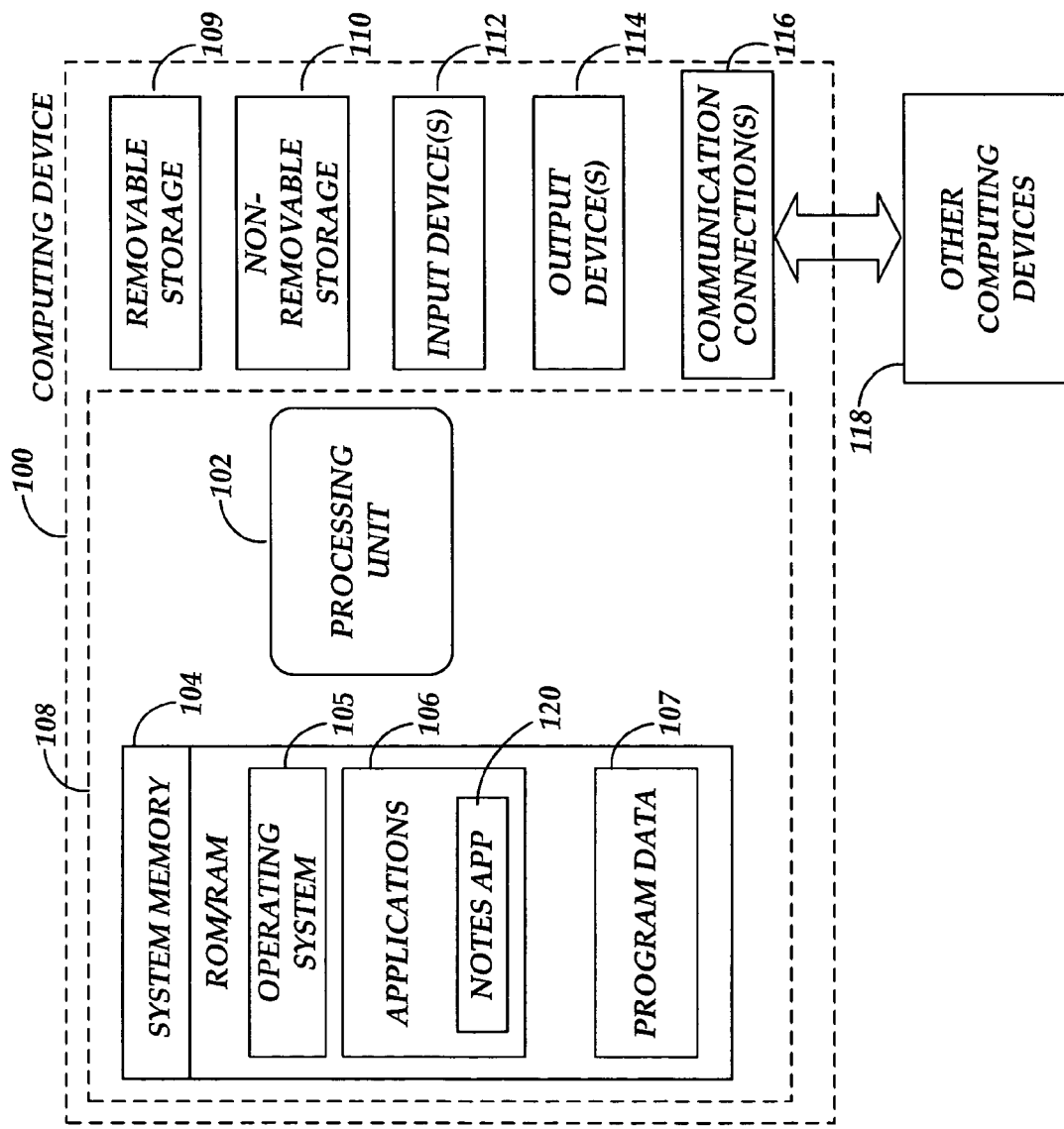
FIG. 1 is a block diagram illustrating an exemplary computing operating environment for implementing various embodiments of the present invention.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding computer executable instructions for executing a computer process. The computer program product may also be a propagated signal on a carrier readable by a computing system and encoding a computer program for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications 106, 120 and may include program data 107. This basic configuration is illustrated in FIG. 1 by those components within dashed line 108.

According to embodiments of the invention, the application 106 may comprise many types of programs, such as an electronic mail program, a calendaring program, an Internet browsing program, and the like. An example of such programs is OUTLOOK® manufactured by MICROSOFT CORPORATION. The application 106 may also comprise a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE™ manufactured by MICROSOFT CORPORATION. A notes application 120 is illustrated for entering, storing and retrieving typed or handwritten notes or other information in accordance with embodiments of the present invention. An example notes application 120 includes ONENOTE® manufactured by MICROSOFT CORPORATION.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
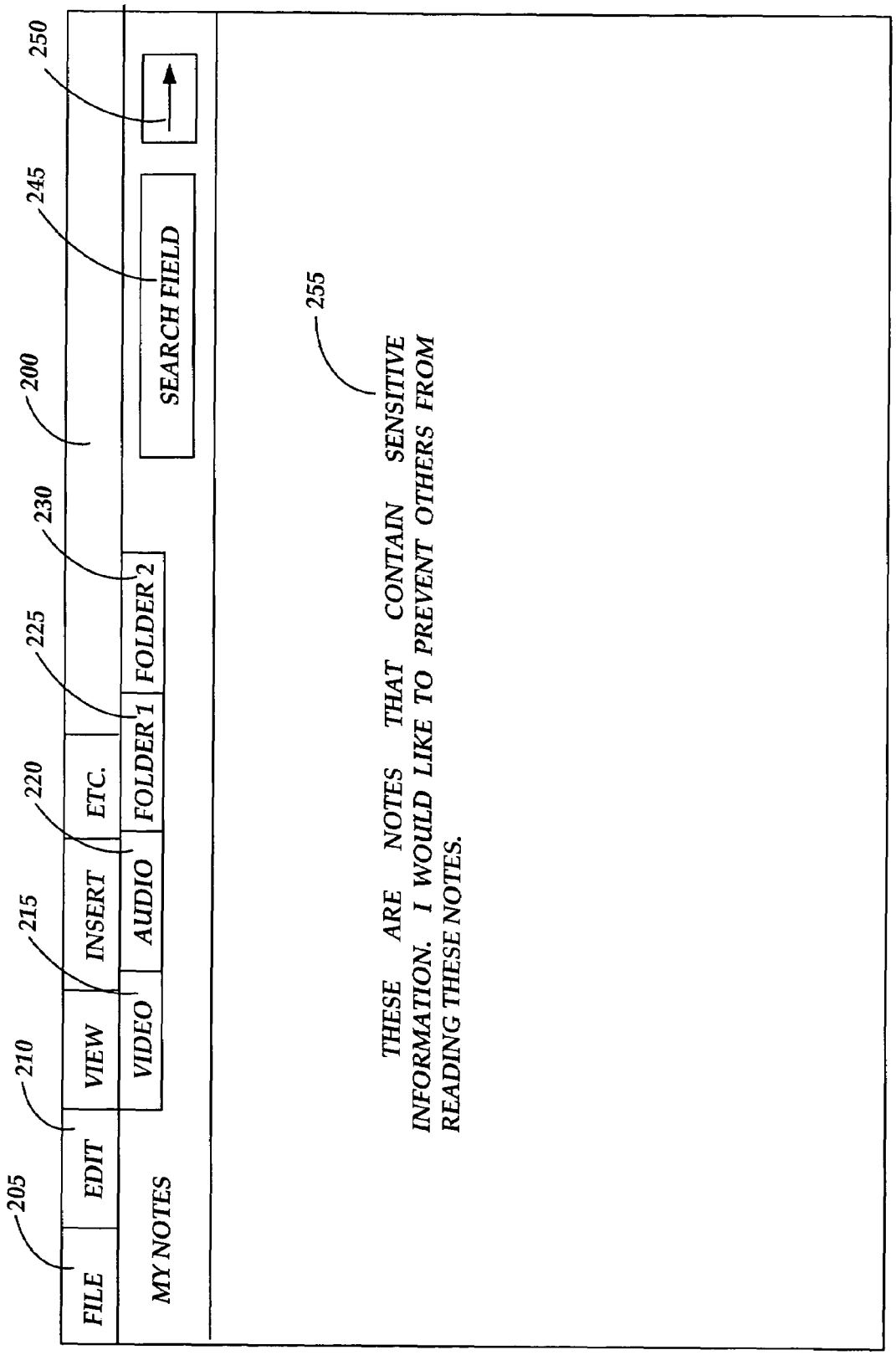
FIG. 2 illustrates a computer screen display of a notes application user interface for entering and displaying typed or handwritten notes.

Referring now to FIG. 2, a user interface 200 of a notes application 120 is provided. According to embodiments, the notes application 120 allows for the entry, storage and retrieval of typed and handwritten notes and other data. An exemplary notes application 120 is ONENOTE® manufactured by MICROSOFT CORPORATION. It will be appreciated, however, that embodiments of the present invention are equally applicable to any suitable application useful for entry, storing and retrieving typed or handwritten data, for example, word processing applications, spreadsheet applications, slide presentation applications, etc. Description of the present invention in terms of a notes application 120 is for purposes of example only and is not limiting of the applicability of the invention to other types of applications.

Referring still to FIG. 2, the user interface 200 of the example notes application 120 includes high level commands, such as the file command 205, the edit command 210, the view command, the insert command, and the like, for storing, formatting, and otherwise manipulating text or data entered and stored via the user interface 200. A number of information storage tabs 215, 220, 225, and 230 are illustrated for allowing a user to access and supplement stored information. For example, the video tab 215 may allow a user to access video information entered and stored with the notes application 120. Likewise, the audio tab 220 may allow the user to access audio files stored using the notes application 120. The folder tabs 225, 230 may allow a user to access one or more folders of stored information. For example, the folder tab 225 may allow a user to access notes stored during a number of school lectures. The folder tab 230 may allow a user to access typed or handwritten notes entered in association with one or more business meetings. As should be appreciated, the illustrated information tabs 215, 220, 225, 230 are for purposes of example only and are not limiting or restrictive of the number of and different types of information storage locations that may be created by the user of the notes application 120.

A data entry area 240 is provided into which a user may type or handwrite a variety of information regarding a variety of topics. For example, if the notes application 120 is functionally connected with a keyboard, a user may type notes or other information directly into the work area 240. On the other hand, if the notes application 120 is configured for operation with an electronic pen device, handwritten notes may be entered into the work area 240 according to well-known electronic pen and ink systems. Once information is typed or handwritten into the work area 240, the information may be stored in a variety of storage locations for subsequent retrieval and/or editing.

According to embodiments of the present invention, a search pane 245 is provided in the user interface 200 for entry of a search string for requesting typed or handwritten notes or other information containing the entered search string. After a requesting user enters the search string and selects the search activation button 250, one or more selected information storage locations is searched for typed or handwritten information containing the entered text string. For example, if a user desires to search the contents of a particular information storage folder for notes previously entered by the user relating to an entered search string, the user may first select the desired storage folder followed by entry of a desired text string in the search pane 245. After entry of the desired text string and initiation of the search, the selected folder is searched for typed or handwritten entries containing the entered text string. As will be described below, if a portion of information retrieved by such a search has been designated as sensitive information, the designated portion will be covered from view when it is displayed in the work area 240.

Referring still to FIG. 2, a portion of notes or other information 255 is displayed in the work area 240 of the user interface 200. As should be appreciated, the notes 255 may be notes that were previously entered or imported by a user of the notes application 120. Additionally, the notes 255 may be stored in one or more folders of information, and the notes 255 may be displayed as a page of information contained in a document having multiple pages of information. According to embodiments of the present invention, often a user of an application, such as the notes application 120 or a word processing application, may desire to cover a portion of information, such as the notes 255, illustrated in FIG. 2, with a lightweight covering that will prevent a display of the information to others when the information is considered sensitive information. For example, the notes 255 may include personal or business financial information or other private information that should not be displayed to other persons.

Figure 3:
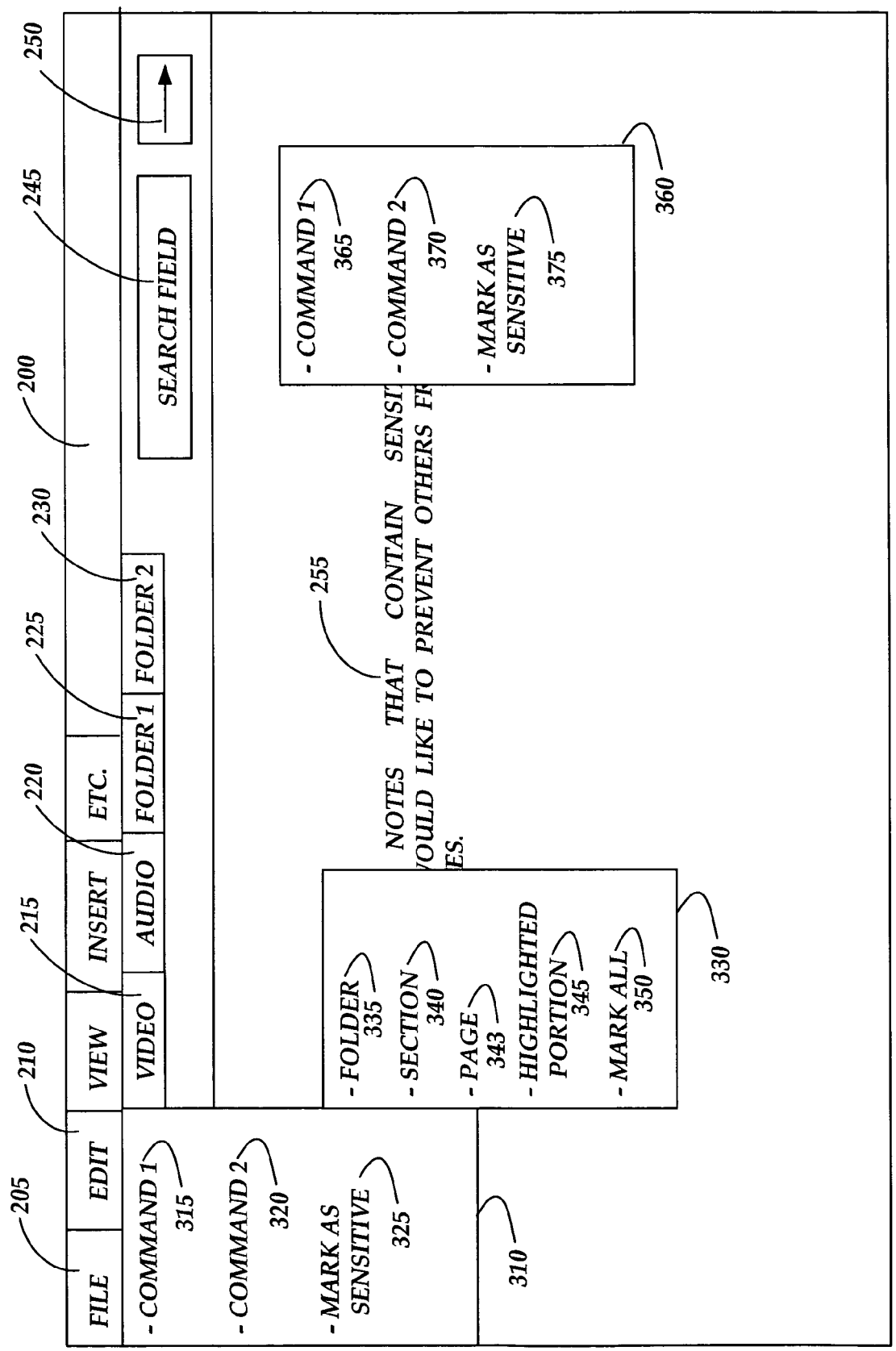
FIG. 3 illustrates the computer screen display of FIG. 2 showing deployed command menus for selectively designating a portion of information as sensitive information.

Referring then to FIG. 3, according to embodiments of the present invention, the notes application 120, word processing application, or any other application suitable for entering and displaying information that may be considered and designated as sensitive information may cover from display portions of information that are designated as sensitive information. Once a user has selected a portion of information for designation as sensitive information, a command may be provided by the application 120 for marking the selected portion of information as sensitive information and for subsequently covering the information from display.

Referring still to FIG. 3, a drop-down command menu 310 may be deployed from a top-level command function, such as the file command 205, the edit command 210, the view command, the insert command, etc., for providing functionality for designating information as sensitive. The example drop-down command menu 310 includes a variety of commands 315, 320 for applying various functionalities to a selected portion of information such as editing functionalities, formatting functionalities, view functionalities, and the like. According to embodiments of the present invention, a "mark as sensitive" function 325 is provided for designating a selected portion of information as sensitive information.

According to the example user interface 200, selection of the "mark as sensitive" command 325 may cause a pop-out menu 330 for providing functions for designating different portions of a memory location or document as sensitive information. For example, selection of the "folder" function 335 may allow all the contents of a given memory location, for example, a folder of documents or other data, to be designated as sensitive information so that all information contained therein will be covered from display according to embodiments of the present invention. Selection of the "section" function 340 allows the marking or designation of a given section of information as sensitive information. For example, if the notes 255 illustrated in the work area 240 are part of a section of information contained in a larger folder of information, selection of the "section" function 340 will designate the entire section in which the notes 255 are contained as sensitive information. Selection of the "page" function 343 allows the designation of a page of information containing the notes 255 as sensitive information. If it is desired that only a portion of the notes 255 should be designated as sensitive information, a portion of the notes 255 may be highlighted in a similar manner in which a portion of the notes 255 may be highlighted for application of a formatting or other property, and the "highlighted portion" function 345 may be selected for designating the highlighted portion of the notes 255 as sensitive information. In addition, a "mark all" function 350 may be selected for designating all information accessible by subsequent users as sensitive information.

Referring still to FIG. 3, a contextual menu 360 is illustrated for deploying in the context of a selected object in the work area 240. For example, the contextual menu 360 may be deployed in the context of the notes 255 by selecting the notes 255 followed by a secondary selection, for example, a right mouse click. The contextual menu 360 deploys in proximity to the selected object and provides one or more commands 365, 370 that are relevant to the selected object. For example, commands 365, 370 may provide formatting or other functions applicable to the selected notes 255. According to embodiments of the present invention, a "mark as sensitive" function 375 is provided in the contextual menu 360 for marking a portion of the selected notes 255 as sensitive information.

It should be understood that the drop-down command menu 310, 330 and the contextual menu 360 are examples of user interface components for providing selectable buttons or controls with which selected portions of information may be designated as sensitive information according to embodiments of the present invention. The user interface components illustrated and described with respect to FIG. 3 are for purposes of example only and are not limiting or restrictive of the many different layouts and formats for user interface components that may be deployed for providing functions for designating one or more portions of information as sensitive information according to embodiments of the present invention. For example, according to another embodiment, a button or other control may be situated among the top-level commands 205, 210 for designating one or more portions of information as sensitive information according to embodiments of the present invention.

Figure 4:
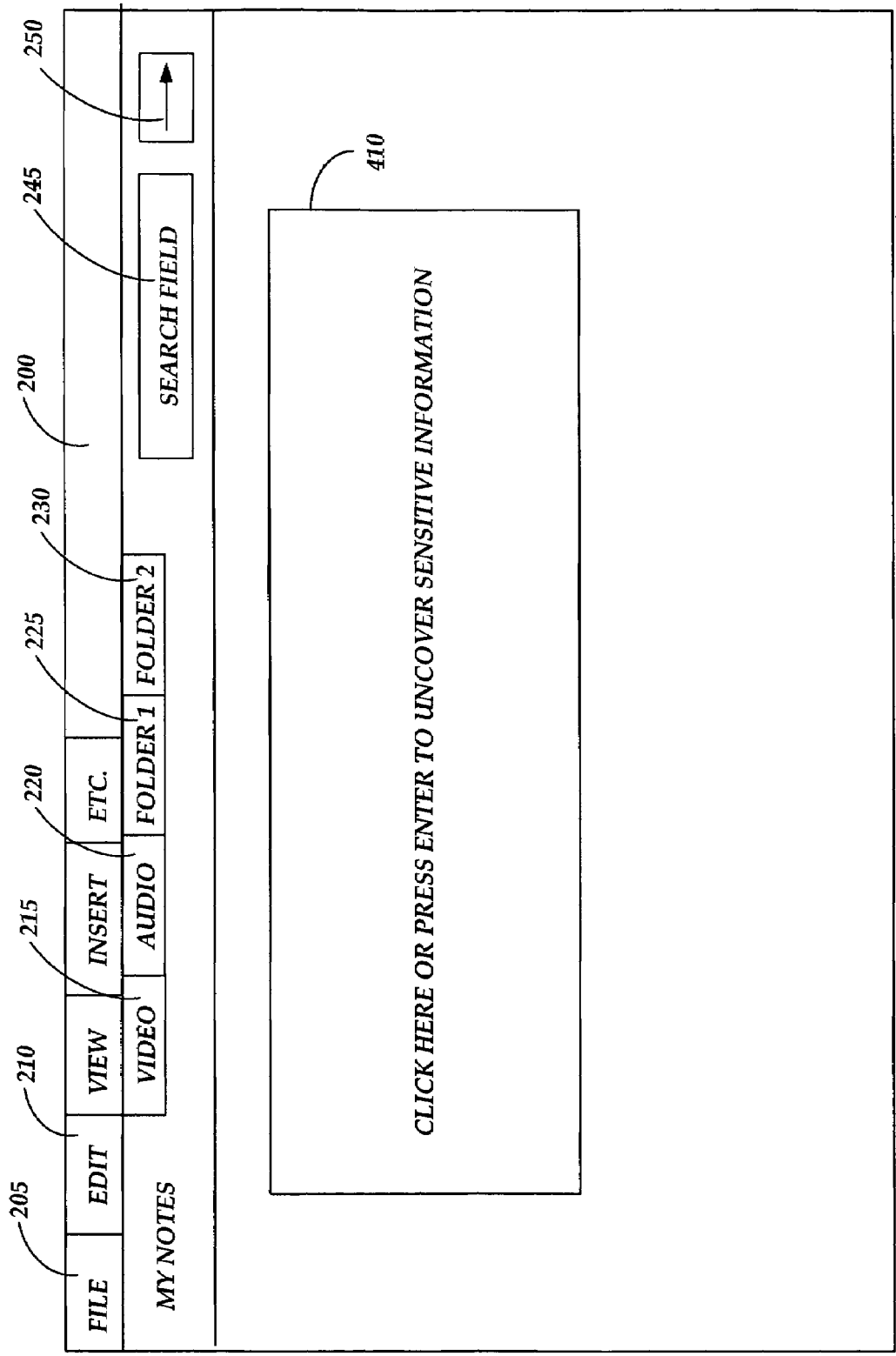
FIG. 4 illustrates the computer screen display of FIG. 2 showing the covering of a portion of information designated as sensitive information.
Figure 5:
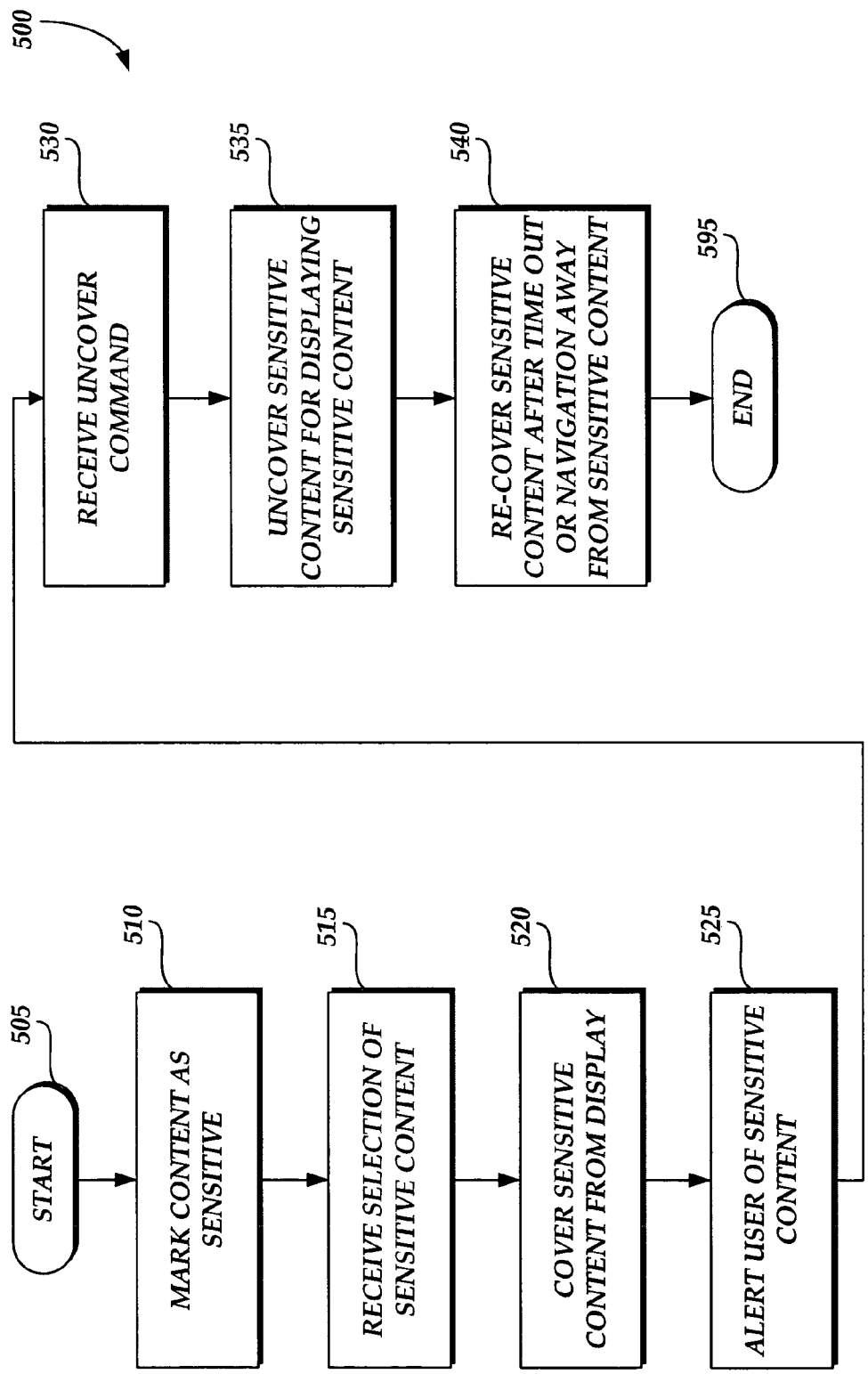
FIG. 5 is a logical flow diagram illustrating a routine for handling sensitive information according to embodiments of the present invention.

Referring now to FIG. 4, after a portion of information, for example, a folder, document, section, page, paragraph, sentence or word, is designated as sensitive information, a range value associated with the designated information is marked by the application 120 for covering from display with a cover 410. That is, if an entire page of information is designated as sensitive information, the notes application 120 or other suitable application will cover the designated page of information with a cover 410 each time the page of information is selected for display. Similarly, if an individual paragraph of information is designated as sensitive information, then the application 120 will cover a display range associated with the designated paragraph of information with a cover 410 to prevent display of the designated paragraph. If an entire document containing multiple pages of information is designated as sensitive information, then each page contained in the document will be covered by the application 120 with a cover 410 to prevent display of the information contained in the pages of the document.

As illustrated in FIG. 4, the cover 410 is an opaque covering that blocks from visual display all of the underlying information that has been designated as sensitive information. For example, the notes 255 illustrated in FIGS. 2 and 3 have been completely covered from display by the cover 410 in response to receiving a designation of the notes 255 as sensitive information. According to one embodiment, the cover 410 may be applied by the application 120 in a manner similar to applying a highlighting color over a designated portion of information. That is, once a particular portion of information is designated as sensitive information, the application 120 may overlay the designated portion of information with an opaque covering that blocks from view all information contained under the covering. According to embodiments of the present invention, the covering 410 may be a "grayed-out" color or other suitable color that may be easily distinguished from other displayed objects and that readily covers from view all underlying information.

According to an alternative embodiment, the covering 410 may be in the form of a deployed window object that is displayed over the display range containing the information designated as sensitive. The deployed window object may be displayed in a similar manner as the display of a dialog box for receiving some type of user interaction or for providing an alert or other information. As such, the entire area of the deployed window object may be designated as a selectable control which when selected causes the window object (covering 410) to be dismissed from display for allowing a viewing of sensitive information displayed under the covering 410.

According to embodiments of the present invention, an alert may be provided on the surface of the covering 410 for notifying a user that the covering may be removed for viewing the underlying information. For example, a text-based notification such as "click here or press enter to uncover sensitive information" may be provided on the surface of the covering 410, as illustrated in FIG. 4. Thus, a user of the information is provided a quick and easy notification and instruction as to how to remove the covering 410 for viewing the underlying information. For example, in response to the alert disposed on the covering 410, a user may select the covering 410, for example, with a mouse click or carriage return, for automatically removing the covering from display. As should be understood, any number of triggers may be provided for removing the covering 410 from display. For example, if the application 120 is equipped for electronic pen and ink functions, the covering 410 may be removed by touching an electronic pen to the display screen in an area containing the covering 410. For another example, a text-based alert, described above, may be designated as a selectable control for dismissing the cover 410. Also, a button or control may be provided in a menu or toolbar of functions for selectively removing a given covering 410.

According to embodiments of the present invention, sensitive information that has been uncovered may be automatically re-covered by the covering 410 based on a variety of re-covering triggers. For example, if no user action is detected for more than a prescribed amount of time, for example, two minutes, the covering 410 may be automatically replaced over the designated sensitive information range. As should be appreciated, such a "time-out" period may be adjusted to different periods of time, for example, five minutes, ten minutes, one minute, etc. Other triggering mechanisms may be employed for automatically replacing the covering 410. For example, if a user selects a different portion of information not included in the designated sensitive information range, the covering 410 may be automatically replaced over the designated sensitive information. In addition, a button or control may be provided in a menu or toolbar of functions for selectively replacing a covering 410 over a designated portion of information.

Having described an exemplary operating environment and various aspects of embodiments of the present invention with respect to FIGS. 1-4, FIG. 5 is a logical flow diagram illustrating a routine for handling sensitive information according to embodiments of the present invention. The routine 500 begins at start block 505 and proceeds to block 510 where selected content is designated as sensitive information by a user. For example, as described above, an entire folder of information, a page of information, a paragraph of information, and/or sentences or words of information may be selected by a user and designated as sensitive information. At block 515, the selected information is designated as sensitive information, as described above with reference to FIG. 3.

At block 520, the designated sensitive information is covered from display by the application 120 by placing an opaque covering 410 over the designated information. As should be understood, anytime the designated information is subsequently opened, browsed to, or otherwise displayed, the covering 410 will be deployed by the application 120 or the operating system 105 over the designated portion of information. For example, if the designated portion of information is a single page in a document containing ten pages of information, when a user browses to the designated page of information contained in the ten pages of information, the designated page of information will be covered by a covering 410, as illustrated in FIG. 4. For another example, if the designated information is a single paragraph of information contained in a page of information, when the page of information is launched, browsed to, or is otherwise displayed, the designated paragraph of information will be covered by a covering 410.

At block 525, upon browsing to, launching or otherwise opening information or data designated as sensitive information, the designated information is covered by the covering 410, and an alert may be provided to the user to notify the user of the covered sensitive information and to instruct the user as to one or more methods for removing the covering 410. At block 530, an uncover command is received, for example, a mouse click on the covering 410, a carriage return, or other suitable command for removing the covering 410. In response, at block 535, the covering 410 is removed for displaying the sensitive information.

At block 540, the sensitive information may be automatically re-covered by the application 120 or operating system 105 according to one or more re-covering triggers. For example, if a prescribed amount of time elapses without user action, for example, cursor movement, text or data entry, or the like, the notes application 120 may automatically re-cover the designated sensitive information. For another example, if the user navigates away from the portion of information designated as sensitive information, for example, by selecting an insertion point in a different portion of information not part of the designated sensitive information, the designated sensitive information may be automatically re-covered by the application 120. The routine ends at block 595.

As described herein, methods, systems, and computer products are provided for applying a privacy cover over designated portions of information to prevent the designated portions of information from being displayed to unauthorized users. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method of preventing the display of sensitive information, comprising:

receiving an input from a user in a data entry area of a user interface, the input comprising information for display on a computer-enabled display screen;

receiving a selection from the user in the user interface that designates at least a portion of the entered information as sensitive information, wherein the selection includes selection on a menu including a plurality of selectable functions for designating the at least a portion of the entered information as sensitive information, the selectable functions including: (i) a folder function that allows a selected folder associated with the entered information to be marked as sensitive information; (ii) a section function that allows a selected section of the entered information to be marked as sensitive information; (iii) a page function that allows a selected page of the entered information to be marked as sensitive information; (iv) a highlighted portion function that allows a highlighted portion of the entered information to be marked as sensitive information; and (v) a mark all function that allows all of the entered information to be marked as sensitive information;

overlaying the designated portion of the information with a covering for preventing viewing of the designated portion of the information when the designated portion of the information is displayed;

displaying an alert in the covering for notifying the user that the covering may be dismissed by user action, wherein the alert includes instructions as to available methods for removing the covering; and dismissing the covering to allow viewing of the designated portion of the information in response to receiving a selection for dismissing the covering.

2. The method of claim 1, further comprising re-covering the designated portion of the information with the covering after allowing a viewing of the designated portion of the information.

3. The method of claim 1, whereby in response to receiving a selection that designates the at least a portion of the information as sensitive information, marking a data range in the received information for overlaying with the covering during a subsequent display of the designated portion of the information.

4. The method of claim 1, whereby overlaying a covering over the designated portion of the information includes superimposing a window object over the designated portion of the information.

5. The method of claim 4, further comprising designating the window object as a selectable control which when selected causes the window object to be dismissed so that the designated portion of the information may be viewed.

6. The method of claim 1, whereby notifying the user that the covering may be dismissed by user action includes notifying the user that the covering may be dismissed by selecting the covering.

7. The method of claim 1, whereby notifying the user that the covering may be dismissed by user action includes notifying the user that the covering may be dismissed by selection of a carriage return.

8. The method of claim 1, whereby notifying the user that the covering may be dismissed by user action includes notifying the user that the covering may be dismissed by selection of a selectable control designated for dismissing the covering.

9. The method of claim 2, whereby re-covering the designated portion of the information with the covering includes re-covering the designated portion of the information with the covering after a prescribed period of user inaction.

10. The method of claim 2, whereby re-covering the designated portion of the information includes re-covering the designated portion of the information upon receiving a selection of a selectable control for recovering the designated portion of the information.

11. The method of claim 2, whereby re-covering the designated portion of the information includes re-covering the designated portion of the information upon receiving a selection of a portion of the information not included in the designated portion of the information.

12. A computer readable storage medium containing computer executable instructions which when executed by a computer perform a method of preventing the display of sensitive information, comprising:

receiving an input from a user in a data entry area of a user interface, the input comprising information for display on a computer-enabled display screen;

receiving a selection from the user in the user interface that designates at least a portion of the entered information as sensitive information, wherein the selection includes selection on a menu including a plurality of selectable functions for designating the at least a portion of the entered information as sensitive information, the selectable functions including: (i) a folder function that allows a selected folder associated with the entered information to be marked as sensitive information; (ii) a section function that allows a selected section of the entered information to be marked as sensitive information; (iii) a page function that allows a selected page of the entered information to be marked as sensitive information; (iv) a highlighted portion function that allows a highlighted portion of the entered information to be marked as sensitive information; and (v) a mark all function that allows all of the entered information to be marked as sensitive information;

overlaying the designated portion of the information with a covering for preventing viewing of the designated portion of the information when the designated portion of the information is displayed;

displaying an alert in the covering for notifying the user that the covering may be dismissed by user action, wherein the alert includes instructions as to available methods for removing the covering;

dismissing the covering to allow viewing of the designated portion of the information in response to receiving a selection for dismissing the covering; and automatically re-covering the designated portion of the information with the covering after allowing a viewing of the designated portion of the information.

13. A computer readable storage medium containing computer executable instructions which when executed by a computer perform a method of preventing the display of sensitive information, comprising:

receiving an input from a user in a data entry area of a user interface, the input comprising information for display on a computer-enabled display screen;

receiving a selection from the user in the user interface that designates at least a portion of the entered information as sensitive information, wherein the selection includes selection on a menu including a plurality of selectable functions for designating the at least a portion of the entered information as sensitive information, the selectable functions including: (i) a folder function that allows a selected folder associated with the entered information to be marked as sensitive information; (ii) a section function that allows a selected section of the entered information to be marked as sensitive information; (iii) a page function that allows a selected page of the entered information to be marked as sensitive information; (iv) a highlighted portion function that allows a highlighted portion of the entered information to be marked as sensitive information; and (v) a mark all function that allows all of the entered information to be marked as sensitive information;

superimposing a window object over the designated portion of the information for preventing viewing of the designated portion of the information when the designated portion of the information is displayed, where the window object is a selectable control which when selected causes the window object to be dismissed so that the designated portion of the information may be viewed;

displaying an alert in the window object for notifying the user that the window object may be dismissed by user action, wherein the alert includes instructions as to available methods for removing the window object; and dismissing the window object to allow viewing of the designated portion of the information in response to receiving a selection of the window object.

\* \* \* \* \*